United States Patent
Deb et al.

(10) Patent No.: US 8,627,152 B1
(45) Date of Patent: Jan. 7, 2014

(54) SIMULTANEOUS ERROR DETECTION DURING VM IMPORT

(75) Inventors: Bashuman Deb, Herndon, VA (US); Avichai M. Lissack, McLean, VA (US)

(73) Assignee: Amazon Technologies, Inc., Reno, NV (US)

( * ) Notice: Subject to any disclaimer, the term of this patent is extended or adjusted under 35 U.S.C. 154(b) by 249 days.

(21) Appl. No.: 13/296,003

(22) Filed: Nov. 14, 2011

(51) Int. Cl.
*G06F 11/00* (2006.01)

(52) U.S. Cl.
USPC ............................................. 714/49; 714/4.1

(58) Field of Classification Search
USPC ........................................ 714/4.1, 49, 6.3, 48
See application file for complete search history.

(56) References Cited

U.S. PATENT DOCUMENTS

| | | | |
|---|---|---|---|
| 6,961,868 B2 * | 11/2005 | Tormasov et al. ............. | 714/6.1 |
| 8,499,191 B2 * | 7/2013 | Shimada et al. ............. | 714/4.11 |
| 2009/0276771 A1 * | 11/2009 | Nickolov et al. ............. | 717/177 |
| 2010/0192049 A1 * | 7/2010 | Lee et al. ..................... | 714/804 |
| 2010/0251035 A1 * | 9/2010 | Hasegawa et al. ............ | 714/49 |
| 2011/0202795 A1 * | 8/2011 | Marathe et al. ............... | 714/23 |
| 2012/0226938 A1 * | 9/2012 | Sakaguchi et al. ............ | 714/16 |
| 2013/0007216 A1 * | 1/2013 | Fries et al. ................... | 709/218 |
| 2013/0041872 A1 * | 2/2013 | Aizman et al. ................ | 707/690 |

* cited by examiner

*Primary Examiner* — Yolanda L Wilson
(74) *Attorney, Agent, or Firm* — Lee & Hayes, PLLC

(57) ABSTRACT

Architectures and techniques for uploading virtual machine (VM) images to a network-accessible computing platform from a client device while simultaneously performing error detection of the VM images at the client device. One technique can include transmitting a request from the client device to upload VM images. The technique can further include receiving an application from the computing platform and using the application to reconstitute the VM images from a first stream at the client device while performing error detection. The technique also includes using the application to upload the VM images from a second stream at the client device to the computing platform while performing the error detection.

25 Claims, 4 Drawing Sheets

SIMULTANEOUS ERROR DETECTION DURING VM IMPORT

BACKGROUND

Large-scale, network-based computing represents a paradigm shift from traditional client-server computing relationships. With large-scale, network-based computing platforms (e.g., data centers), customers are able to leverage shared resources on-demand by renting resources that are owned by third parties and that reside "in the cloud." With these resources, customers of the platform are able to launch and maintain large applications without actually owning or servicing the underlying infrastructure necessary for these applications. As such, network-accessible computing platforms, often referred to as "cloud-computing platforms' or "cloud-computing environments," have expanded the class of individuals and companies able to effectively compete in the realm of computing applications.

Generally, customers of a network-based computing platform launch and maintain large applications within the network-based computing platform through the use of one or more virtual machine images. Virtual machine images can be created by the network-based computing platform. However, often, the customers already have virtual machine images within their own systems. Thus, it can be desirable to retrieve the virtual machine images from the customer's own system. Such retrieval however generally utilizes a great deal of resources and bandwidth within both the network-based computing platform and the customer's own system. Currently, if the customer already has virtual machine images, the virtual machine images are retrieved from the customer's system by the network-based computing platform and then, once the virtual machine images are fully uploaded to the network-based computing platform, the network-based computing platform checks the virtual machine images to make sure that they are compatible with the platform. That is, the network-based computing platform conducts an error detection process upon receiving the virtual machine images.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
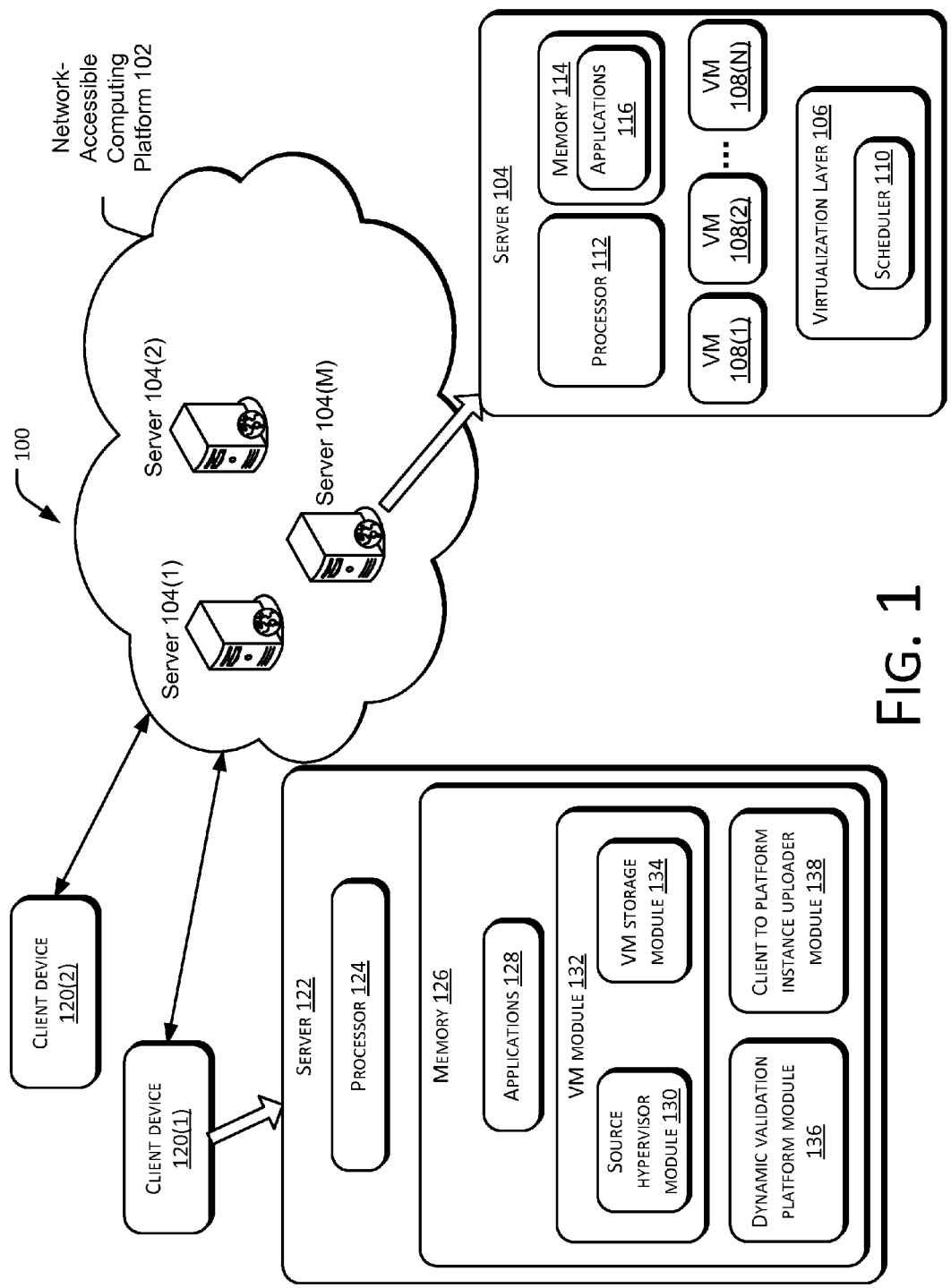
FIG. 1 illustrates an example computing environment in which virtual machine (VM) images are uploaded to a network-accessible computing platform from a client device while simultaneously performing error detection of the VM images at the client device.

This disclosure describes architectures and techniques for uploading virtual machine images from a client device to a shared computing environment. The disclosure also describes architectures and techniques for reconstituting the virtual machine images from a compressed stream at the client device and performing an error detection process during the reconstituting process while simultaneously uploading the virtual machine images to the shared computing environment from another compressed stream at the client device. In accordance with various embodiments, the shared computing environment is a network-accessible computing platform (or cloud computing environment). For instance, one or more entities may host and operate a network-accessible computing platform that includes different types of network resources, such as a storage service, a load balancing service, a compute service, a security service, or any other similar or different type of network-accessible service. The services are performed using various computing devices, wherein the computing devices include one or more processors that each includes one or more processing cores.

In an embodiment, when applications of a client device are to be executed at a particular network-accessible computing platform, virtual machine (VM) images are utilized by the network-accessible computing platform. Often, the network-accessible computing platform creates the VM images on its own on behalf of the client device. However, the client device often already includes VM images that are utilized by the client device itself or are utilized by a different computing platform. Thus, the particular network-accessible computing platform may desire to obtain the VM images from the client device in order to avoid the necessity of creating the VM images from the beginning.

The client device can therefore transmit a request to the particular network-accessible computing platform to provide VM images from the client device to the network-accessible computing platform. The client device can receive from the network-accessible computing platform an application for uploading VM images from the client device to the network-accessible computing platform. The application is generally configured to upload the VM images from a first compressed stream at the client device to the network-accessible computing platform and to simultaneously reconstitute the VM images from a second compressed stream at the client device. The application is further configured to perform error detection of the VM images during reconstitution at the client device. Accordingly, the VM images are reconstituted, by the application from the second compressed stream at the client device and while reconstituting the VM images, the application performs error detection of the VM images at the client device.

While performing error detection of the VM images, the application uploads the VM images from the first compressed screen at the client device to the network-accessible computing platform. The uploading generally occurs over a network, such as the Internet. When an error is detected within the VM images, uploading of the VM images is halted. The client device is generally notified of the error and the halting of the uploading. Such notification can be performed by the application or by the network-accessible computing platform. In general, if uploading of the VM images is halted, then the application can be removed from the client device and any other resources that have been utilized at the client device can be freed up. Any resources being utilized at the network-accessible computing platform can also be freed up.

Example Architecture

FIG. 1 illustrates an environment 100 for implementing the aforementioned techniques utilizing a cloud-based environment. The environment of FIG. 1 includes a network-accessible computing platform or services provider 102 that provides network-accessible computing services via a network of computing devices represented as one or more servers 104(1), 104(2), . . . , 104(M), which may include both resources and functionality. The network-accessible computing platform 102 and its services may be referred to as Infrastructure as a Service (IaaS) and/or Platform as a Service (PaaS). The computing devices available to provide computing services within the network-accessible computing platform 102 may be in the form of dedicated servers, shared servers, virtual servers, server slices, processors, processor cycles, and so forth. While FIG. 1 illustrates the computing devices in the form of servers 104, this is not meant to be limiting and is presented as such simply for ease and clarity.

As illustrated, each of the servers 104 may include a virtualization layer 106, such as a hypervisor or a virtual machine monitor (VMM) that can create one or more virtual machine images (VM) 108(1), 108(2), . . . , 108(N) for sharing resources of the server 104, if creation of the one or more virtual machine images 108 is needed. As illustrated, the virtualization layer 106 may also include a scheduler 110. The scheduler 110 may generally control processing cores of processors to perform various functions and execute various instructions within the network-accessible computing platform 102 on behalf of the virtual machine images 108. While FIG. 1 illustrates the scheduler 110 as residing within the virtualization layer 106, the scheduler 110 may reside in other locations in other implementations.

Each of the servers 104 also generally includes one or more processors 112 and memory 114, which may comprise any sort of computer-readable storage media and may store one or more applications 116. The servers may also include one or more other components typically found in computing devices, such as communication connections, input/output I/O interfaces, and the like.

One or more client devices 120(1), 120(2), . . . , 120(P) communicate and interact with the network-accessible computing platform 102 in order to obtain computing services from the network-accessible computing platform 102. The client devices 120 communicate with the network-accessible computing platform 102 via a network, such as, for example, the Internet and communication connections and I/O interfaces. Generally, the computing services from the network-accessible computing platform 102 are available to the client devices 120 in scalable increments or amounts, which can be dynamically increased or decreased in response to usage and/or demand. Service fees may be tied to the amount of the resources that are actually used.

Generally, the client devices 120 are in the form of one or more servers 122. However, this is not meant to be limiting and it is presented as such for ease and clarity. Similar to the network-accessible computing platform 102, each of the one or more servers 122 that make up a client device 120 generally includes one or more processors 124 and memory 126. The memory 126 generally has stored therein one or more applications 128. One of the applications 128 is generally in the form of a source hypervisor module or virtual machine monitor module 130 within a VM module 132 of the memory 126. The source hypervisor module 130 is utilized to create one or more VM images. VM module 132 further includes a VM storage module 134 that can be utilized to store VM images from the source hypervisor module 130. Additional applications 128 within the memory 126 generally include a dynamic validation platform module 136 and a client to platform instance uploader module 138 to provide error detection uploading of the VM images to the network-accessible computing platform 102. These various modules and associated techniques will be further described in more detail herein.

The computing services available from the network-accessible computing platform 102 may include functional elements or services. Functional elements or services may comprise applications or sub-applications that are used as building blocks for client device applications. For example, the network-accessible computing platform 102 may provide predefined database functionality in the form of a discrete service that can be instantiated on behalf of a client device. Functional components may relate to network communications and other services or activities. Network-related services may, for example, include firewalls, load balancers, filters, routers, and so forth. Additional functional components may be available for such things as graphics processing, language translation, searching, etc.

The computing services may also be characterized by service types or categories, such as by the types or categories of services they provide. Different types or categories of services may include database services, web servers, firewalls, file replicators, storage services, encryption services, authentication services, and so forth. In some embodiments, services may be categorized at a relatively high level. For example, a "database services" category may include various different implementations of database services. In other embodiments, services may be categorized more specifically or narrowly, such as by type or family of database services. In embodiments such as this, for example, there may be different categories for relational databases services and non-relational database services, and for SQL and other implementations of databases services.

Service parameters for the computing services provided by the network-accessible platform 102 may correspond to options, configuration details, speeds, capacities, variations, quality-of-service (QoS) assurances/guaranties, and so forth. In the example of a database service, the service parameters may indicate the type of database (relational vs. non-relational, SQL vs. Oracle, etc.), its capacity, its version number, its cost or cost metrics, its network communication parameters, and so forth.

Example Processes

Figure 2:
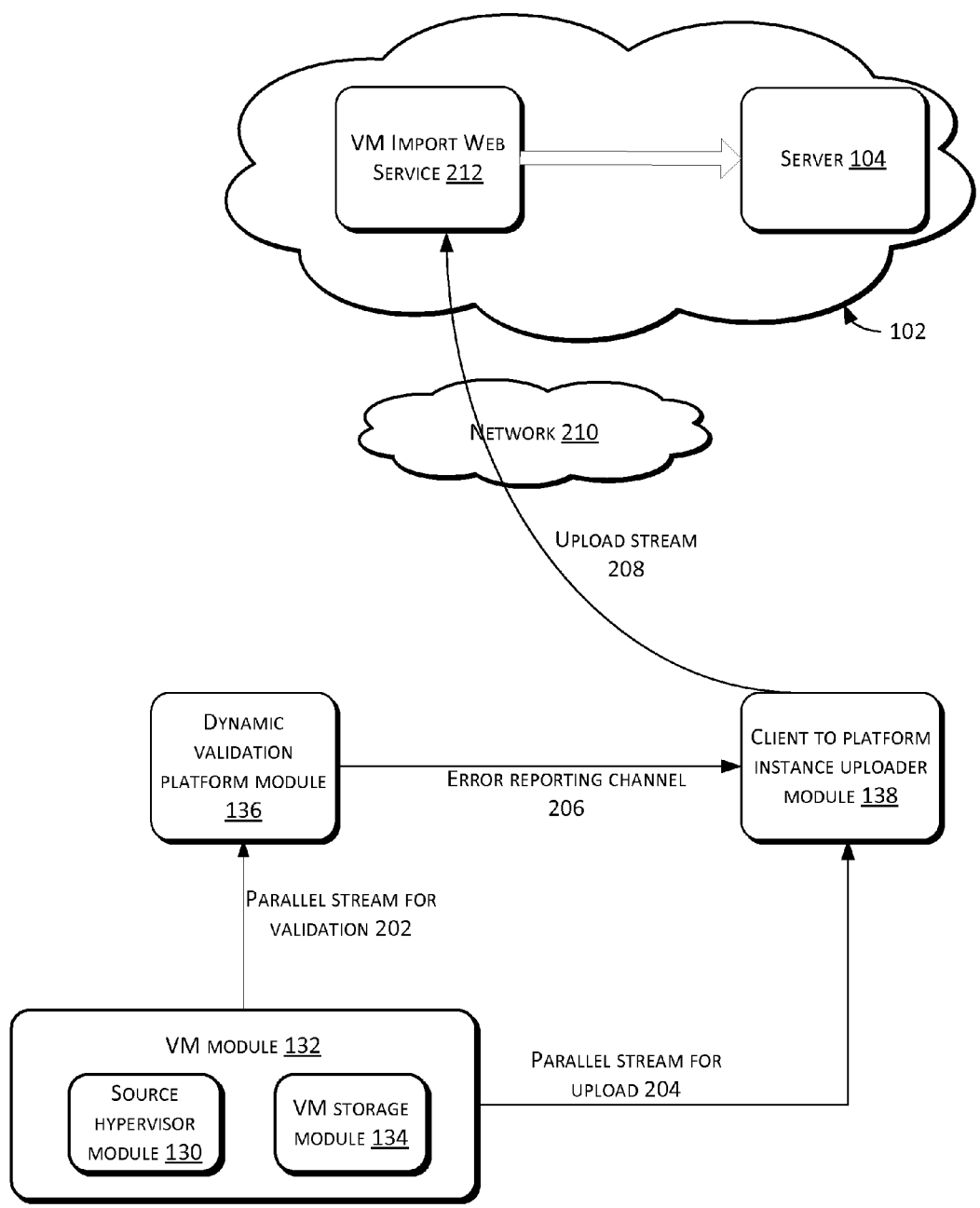
FIG. 2 illustrates an example of information flow utilizing some components within the computing environment of FIG. 1.

Referring to FIG. 2, an arrangement 200 is illustrated for providing one or more virtual machine images from client devices 120 to a network-accessible computing platform 102 to provide one or more of the VM images 108 at one or more servers 104. The VM images can be obtained from a source hypervisor module or virtual machine monitor 130 within the VM module 132 included at a client device 120. The source hypervisor module 130 can be utilized to create VM images at the client device 120. The VM images are generally stored within the VM storage module 134 within the VM module 132 at the client device 120. The VM images are generally compressed so that storage space is minimized.

The client device 120 also includes a dynamic validation platform module 136 and a client to platform instance uploader module 138. These components can be in the form of software or firmware at the client device 102. Generally though, the validation platform module 136 and the client to platform instance uploader module 138 are provided in the form of an application by the network-accessible computing platform 102 to the client device 120 upon request from the client device 120. The validation platform module 136 and the client to platform instance uploader module 138 can be utilized by the network-accessible computing platform 102 to receive VM images from either the source hypervisor module 130 or from the VM storage module 134.

As noted, the network-accessible computing platform 102 generally provides an application to the client device that provides the necessary platforms to the client device such as the dynamic validation platform module 136 and the client to platform instance uploader module 138, if these modules are not already on the client device 120. The source hypervisor module 130 or the VM storage module 134, depending upon where the VM images are being retrieved from, begin to stream the compressed VM images in parallel to the dynamic validation platform 136 and the client to platform instance uploader 138. The compressed VM images are streamed along a first stream 202 to the validation platform module 136 and the compressed VM images are streamed along a second stream 204 to the client to platform instance uploader module 138.

The dynamic validation platform module 136 then begins to check the compressed VM images for errors and compatibility issues. This is accomplished by reconstituting the VM images within the dynamic validation platform module 136. Potential errors include malformed boot sectors, an operating system for the VM images that is not supported by the network-accessible computing platform 102, corrupted VM images, encrypted VM images, etc.

While the dynamic validation platform module 136 is checking the VM images for compatibility issues and potential errors, the client to platform instance uploader module 138 is simultaneously streaming the VM images to the network-accessible computing platform 102. This uploading is generally accomplished along an upload stream 208 over a network 210 such as, for example, the Internet. The compressed VM images are uploaded to a VM import web service 212. The VM import web service 212 is generally included within a server 104 with the network-accessible computing platform 102, but is not required to be. The VM import web service 212 decompresses and reconstitutes the VM images uploaded from the client device 120. The VM import web service 212 provides the reconstituted VM images to an appropriate one or more of the servers 104 within the network-accessible computing platform 102. The appropriate one or more servers 104 could include the server 104 that provides the VM import web service 212.

If for some reason the dynamic validation platform module 136 determines that the VM images are not compatible for use with the network-accessible computing platform 102 or that the VM images contain one or more errors, a message is sent from the validation platform module 136 to the client to platform instance uploader module 138 along the error reporting channel 206 to stop uploading of the VM images to the network-accessible computing platform 102. A message is also provided by the dynamic validation platform module 136 or by the network-accessible computing platform 102 to the client device 102 that the VM images are not compatible and/or contain one or more errors. Resources within the network-accessible computing platform 102 that have been utilized to upload the VM images are then freed up. Any data relating to the partially uploaded VM images can be deleted from the network-accessible computing platform 102. Likewise, resources at the client device 120 that have been utilized for the error detection and the uploading can be freed up. Resources and/or data at the client device 120 relating to the partially uploaded VM images can also be deleted. For example, application providing the dynamic validation platform module 136 and the client to platform instance uploader module 138 can be deleted from the client device 120 if desired. The deletion can be performed by the network-accessible computing platform 102, by the client device 120 or by the application itself. Alternatively, these resources can be maintained by the client device 120 in the event that the client device 102 fixes whatever problems have been discovered with respect to the VM images and then wishes to try again to provide the VM images to the network-accessible computing platform 102.

In an alternative embodiment, when one or more errors are detected by the dynamic validation platform module 136, the uploading of the VM images may simply be suspended to allow the client device 120 an opportunity to correct the detected one or more errors. Once corrected, uploading of the VM images may resume. Likewise, reconstitution and error detection of the VM images by the dynamic validation platform module 136 may be suspended while the client device fixes the detected one or more errors. In another alternative embodiment, if detected errors are minor and/or possibly fixed by the network-accessible computing platform 102 and/or the client device 120, halting of the uploading of the VM images or suspension of the uploading of the VM images may not occur until a threshold of errors is met or exceeded.

In the case where the VM images are acceptable for use within the network-accessible computing platform 102, i.e. VM images contain no errors and are compatible for use within the network-accessible computing platform 102, then upon completion of the uploading of the VM images to the network-accessible platform 102, resources being utilized for uploading the VM images within the network-accessible computing platform 102 can be freed up. Likewise, resources at the client device 120 that are no longer needed once the VM images have been fully uploaded to the network-accessible computing platform 102 can be freed up. For example, if desired, the application providing the dynamic validation platform module 136 and the client to platform instance uploader 138 can be deleted from the client device 120. The deletion can be performed by the network-accessible computing platform 102, by the client device 120 or by the application itself.

The application providing the dynamic validation platform module 136 and the client to platform instance uploader 138 can also be kept by the client device 120 if desired. The application can be kept in order to provide additional VM images from the client device 120 to the network-accessible computing platform 102 in the future. Provision of the application to the client device 120 from the network-accessible computing platform 102 can thus be a one-time occurrence per unique client device 120.

While the process for simultaneously validating the VM images and uploading the VM images to the network-accessible computing platform 102 will generally save time due to early detection of potential errors prior to extensive use of resources, there are instances where the entire process may be more time consuming. For example, it may be assumed that the data for the VM images will be provided in an organized format such that needed data for reconstituting the VM images and performing the error detection at the client device 120 will be obtained in a logical order. However, in some instances, the data for the VM images may be provided in a non-organized or random order. Thus, needed data for reconstituting and validating the VM images at the client side may be received out of order, thus delaying the ability to validate the VM images. However, in such instances, the techniques of the present disclosure are still applicable.

In accordance with alternative embodiments, the VM images could be checked directly by obtaining the VM images directly from the source hypervisor module 130 and/or from the VM storage module 134 prior to compression of the VM images. Thus, the need for reconstituting the VM images would be eliminated. However, such an embodiment would generally require direct interaction between the network-accessible computing platform 102 and the client device 120. The bandwidth needed for uploading the VM images would also be increased.

Figure 3:
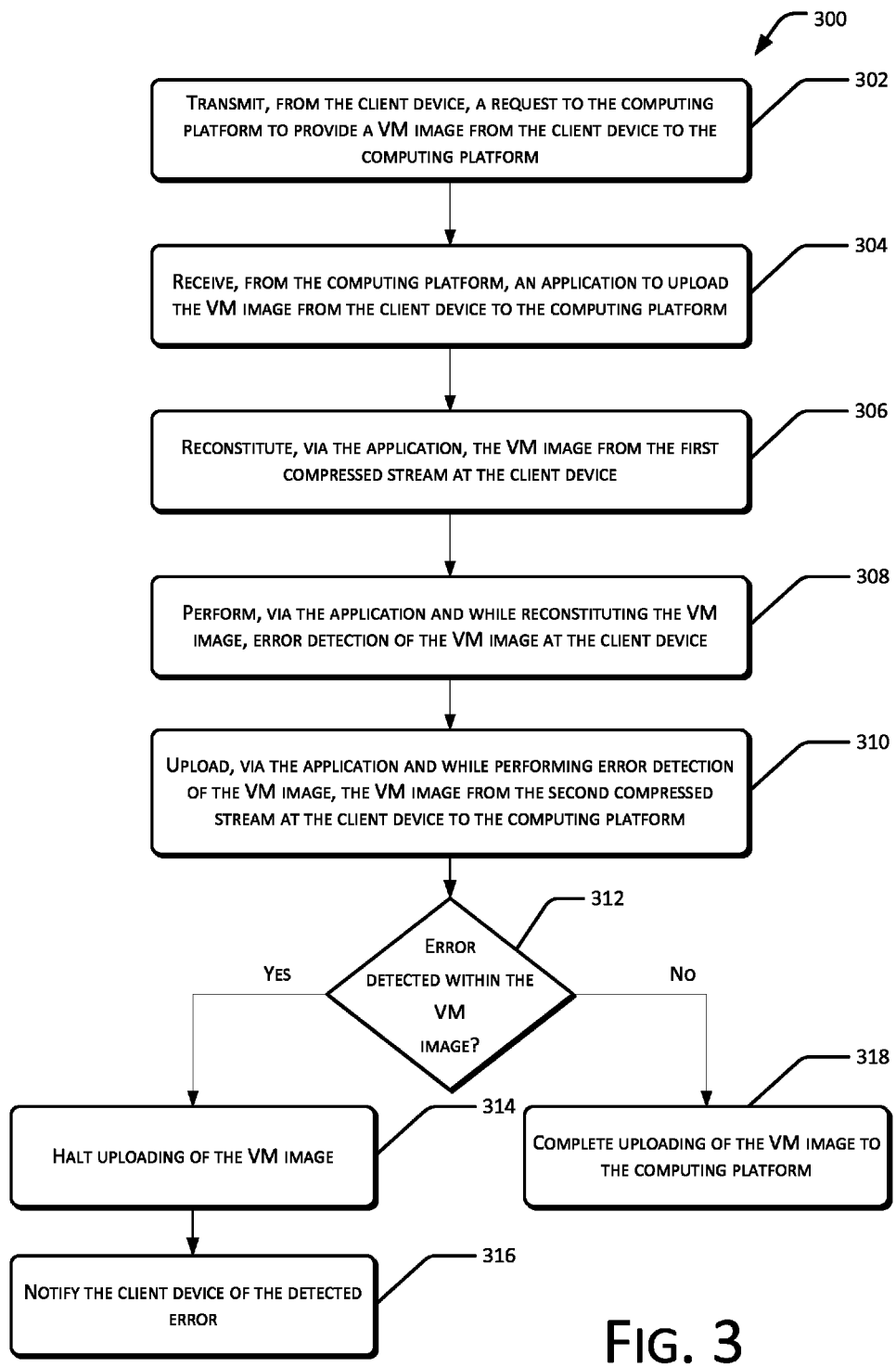
FIG. 3 illustrates an example method of uploading VM images from a client device to the network-accessible computing platform within the computing environment of FIG. 1.
Figure 4:
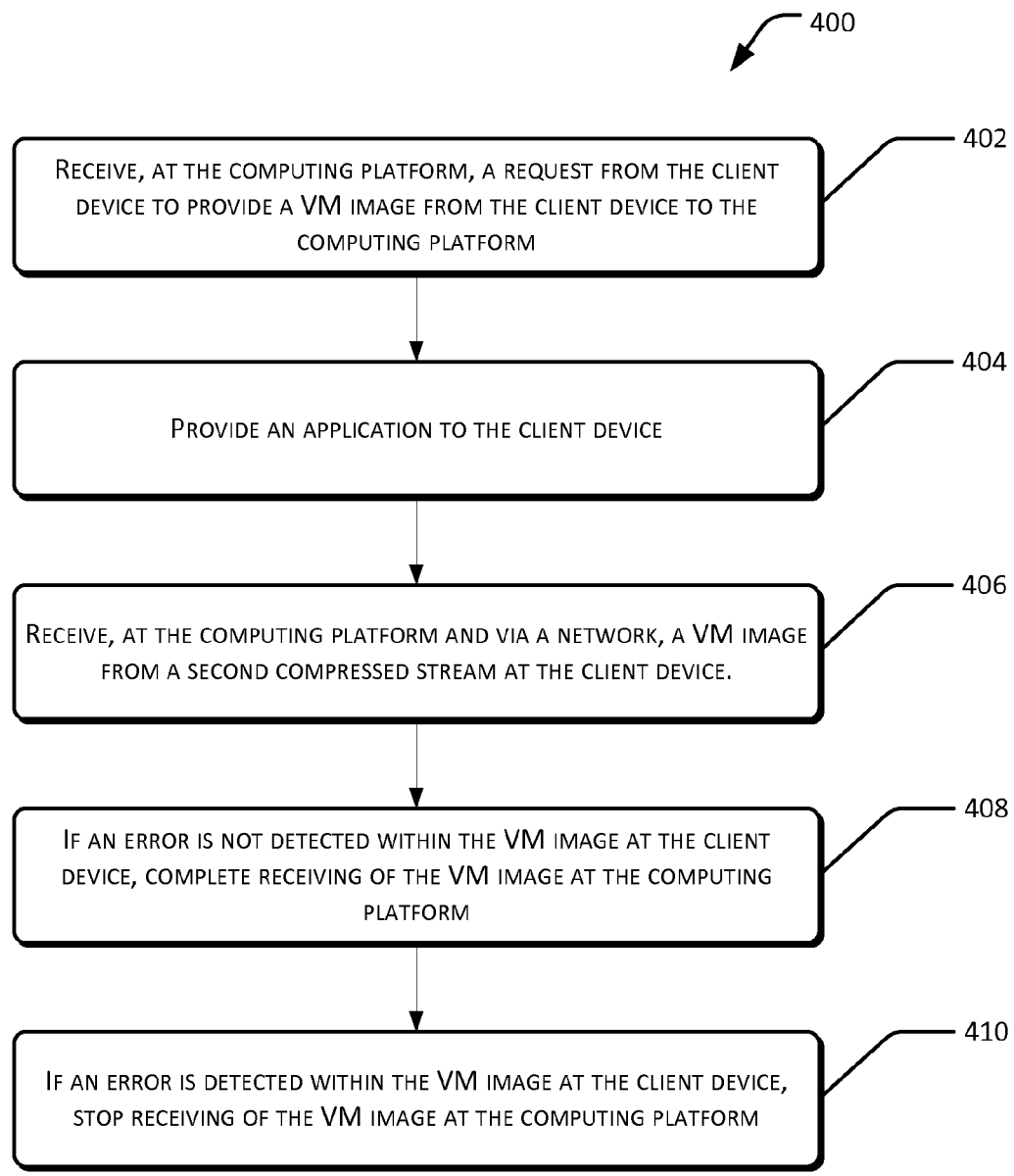
FIG. 4 illustrates an example method of receiving VM images from a client device at the network-accessible computing platform within the computing environment of FIG. 1.

FIGS. 3 and 4 are example processes that the architecture 100 of FIG. 1 may implement. Theses processes (as well as other processes described throughout) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to network-accessible computing platforms, the architectures and techniques are equally applicable to other computing environments and computing devices.

FIG. 3 illustrates an example method 300 for providing virtual machine (VM) images from a client device to a computing platform. At 302, the method 300 transmits, from the client device, a request to the computing platform to provide a VM image from the client device to the computing platform.

At 304, the method 300 receives, from the computing platform, an application to upload the VM image from the client device to the computing platform. The application is configured to reconstitute the VM image from a first compressed stream at the client device and perform error detection of the VM image during reconstitution at the client device. The application is further configured to upload the VM image from a second compressed stream at the client device to the computing platform.

At 306, the method 300 reconstitutes, via the application, the VM image from the first compressed stream at the client device. At 308, the method 300 performs, via the application and while reconstituting the VM image, error detection of the VM image at the client device. At 310, the method 300 uploads, via the application and while performing error detection of the VM image, the VM image from the second compressed stream at the client device to the computing platform. Generally, the uploading is performed over a network, such as, for example, the Internet.

At 312, the method 300 determines if an error has been detected within the VM images. If so, then at 314, the method 300 halts uploading of the VM images. Furthermore, at 316, the method 300 notifies the client device of the detected error. If no error is detected, then at 318, the method 300 completes uploading of the VM images to the computing platform.

FIG. 4 illustrates an example method 400 of receiving virtual machine (VM) images at a computing platform from a client device. At 402, the method 400 receives, at the computing platform, a request from the client device to provide a VM image from the client device to the computing platform.

At 404, the method 400 provides an application to the client device. The application is configured to reconstitute the VM image from a first compressed stream and perform error detection of the VM image during reconstitution of the client device. The application is further configured to upload the VM image from a second compressed stream to the computing platform.

At 406, the method 400 receives, at the computing platform and via a network, the VM image from a second compressed stream at the client device. At 408, if an error is not detected within the VM image at the client device, the method 400 completes receiving of the VM image at the computing platform. At 410, if an error is detected within the VM image at the client device the method 400 stops receiving of the VM image at the computing platform.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
transmitting, from a client device, a request to a computing platform to provide a virtual machine (VM) image from the client device to the computing platform;
receiving, from the computing platform, an application to upload the VM image from the client device to the computing platform, wherein the application is configured to (i) reconstitute the VM image from a first compressed stream at the client device and perform error detection of the VM image during reconstitution at the client device, and (ii) upload the VM image from a second compressed stream at the client device to the computing platform;
reconstituting, via the application, the VM image from the first compressed stream at the client device;
while reconstituting the VM image, performing, via the application, error detection of the VM image from the first compressed stream at the client device; and
while performing error detection of the VM image, uploading, via the application and over a network, the VM image from the second compressed stream at the client device to the computing platform.
2. The method of claim 1, further comprising:
detecting an error within the VM image while performing the error detection; and
in response to detecting an error within the VM image, halting uploading of the VM image.
3. The method of claim 2, further comprising:
in response to detecting the error within the VM image, receiving, by the client device, notification of the error.
4. The method of claim 2, further comprising:
in response to detecting the error within the VM image, removing the application from the client device.
5. The method of claim 2, wherein potential errors include malformed boot sectors, unsupported operating system for the VM image, corrupted data for the VM image and encrypted data for the VM image.
6. The method of claim 1, further comprising:
removing the application from the client device after uploading of the VM image is complete.
7. A method comprising:
receiving, at a computing platform, a request from an application on a client device to provide a virtual machine (VM) image from the client device to the computing platform, wherein the application is configured to (i) reconstitute the VM image from a first compressed stream and perform error detection of the VM image during reconstitution at the client device, and (ii) upload the VM image from a second compressed stream to the computing platform;

receiving, at the computing platform, the VM image from the second compressed stream at the client device;

if an error is not detected within the VM image at the client device, completing receiving the VM image at the computing platform; and if an error is detected within the VM image at the client device, stopping receiving of the VM image at the computing platform.

8. The method of claim 7, further comprising:
providing the application to the client device.

9. The method of claim 7, further comprising:
removing the application from the client device.

10. The method of claim 7, further comprising:
if an error is not detected within the VM image at the client device, notifying the client device that receiving the VM image is complete.

11. The method of claim 7, wherein potential errors include malformed boot sectors, unsupported operating system for the VM image, corrupted data for the VM image and encrypted data for the VM image.

12. One or more computing devices arranged as at least a portion of a network-accessible computing platform, the one or more computing devices comprising:
one or more processors; and
memory, wherein the memory includes a plurality of instructions configured to cause, when executed, the one or more processors to:
provide an application to the client device, wherein the application is configured to (i) reconstitute the VM image from a first compressed stream and perform error detection of the VM image during reconstitution at the client device, and (ii) upload the VM image from a second compressed stream to the computing platform;
receive, over a network, the VM image from the second compressed stream; and
based upon no errors being detected within the VM image at the client device, completing receipt of the VM image.

13. The one or more computing devices of claim 12, wherein the plurality of instructions are further configured to cause, when executed, the one or more processors to:
removing the application from the client device.

14. The one or more computing devices of claim 12, wherein the plurality of instructions are further configured to cause, when executed, the one or more processors to:
receive a request from a client device to provide a virtual machine (VM) image from the client device to the computing platform.

15. The one or more computing devices of claim 12, wherein the plurality of instructions are further configured to cause, when executed, the one or more processors to:
based upon an error being detected within the VM image at the client device, notify the client device of the error.

16. The one or more computing devices of claim 12, wherein the plurality of instructions are further configured to cause, when executed, the one or more processors to:
based upon the error being detected within the VM image at the client device, remove the application from the client device.

17. The one or more computing devices of claim 12, wherein the plurality of instructions are further configured to cause, when executed, the one or more processors to:
based upon no errors being detected within the VM image at the client device, notify the client device that no errors were detected after receiving the VM image is complete.

18. The one or more computing devices of claim 12, wherein potential errors include malformed boot sectors, unsupported operating system for the VM image, corrupted data for the VM image and encrypted data for the VM image.

19. One or more computing devices comprising:
one or more processors; and
memory, wherein the memory includes a plurality of instructions configured to cause, when executed, the one or more processors to:
transmit a request to a computing platform to provide a virtual machine (VM) image from the one or more computing devices to the computing platform;
reconstitute the VM image from a compressed stream at the one or more computing devices;
while reconstituting the VM image, perform error detection of the VM image; and
while performing error detection of the VM image, upload, over a network, the VM image from another compressed stream at the one or more computing devices to the computing platform.

20. The one or more computing devices of claim 19, wherein the plurality of instructions are further configured to cause, when executed, the one or more processors to:
detect an error in the VM image; and
in response to detecting an error within the VM image, halt uploading of the VM image.

21. The one or more computing devices of claim 20, wherein the plurality of instructions are further configured to cause, when executed, the one or more processors to:
in response to detecting the error within the VM image, receive notification of the error.

22. The one or more computing devices of claim 20, wherein potential errors include malformed boot sectors, unsupported operating system for the VM image, corrupted data for the VM image and encrypted data for the VM image.

23. The one or more computing devices of claim 19, wherein the plurality of instructions are further configured to cause, when executed, the one or more processors to:
receive, from the computing platform, an application to upload the VM image from the one or more computing devices to the computing platform, wherein the application is configured to (i) reconstitute the VM image from the compressed stream and perform error detection of the VM image during reconstitution at the one or more computing devices and (ii) upload the VM image from the another compressed stream at the one or more computing devices to the computing platform; and
place the application in the memory such that at least some instructions associated with the application become part of the plurality of instructions.

24. The one or more computing devices of claim 23, wherein the plurality of instructions are further configured to cause, when executed, the one or more processors to:
in response to detecting an error within the VM image, remove the application and the instructions associated with the application from the memory.

25. The one or more computing devices of claim 23, wherein the plurality of instructions are further configured to cause, when executed, the one or more processors to:
remove the application and the instructions associated with the application from the memory after uploading of the VM image is complete.

* * * * *